(12) United States Patent
Geen et al.

(10) Patent No.: US 6,977,911 B1
(45) Date of Patent: Dec. 20, 2005

(54) SCALABLE VOICE OVER IP SYSTEM CONFIGURED FOR DYNAMICALLY SWITCHING CODECS DURING A CALL

(75) Inventors: David William Geen, King George, VA (US); Narasimha K. Nayak, Glen Allen, VA (US); Tribhuvan Kambham, Glen Allen, VA (US)

(73) Assignee: Cisco Technology, Inc., San Jose, CA (US)

( * ) Notice: Subject to any disclaimer, the term of this patent is extended or adjusted under 35 U.S.C. 154(b) by 824 days.

(21) Appl. No.: 09/629,057

(22) Filed: Jul. 31, 2000

(51) Int. Cl.[7] .......................................... H04L 12/28
(52) U.S. Cl. ..................... 370/328; 370/338; 370/467; 379/202.01
(58) Field of Search .................. 370/351–357, 370/401, 437, 442, 463–468, 477, 360, 443–444, 370/493–495; 704/104, 226

(56) References Cited

U.S. PATENT DOCUMENTS

| | | | |
|---|---|---|---|
| 5,892,535 A * | 4/1999 | Allen et al. ..................... 725/36 |
| 6,055,268 A * | 4/2000 | Timm et al. ................. 375/229 |
| 6,434,139 B1 * | 8/2002 | Liu et al. ..................... 370/352 |
| 6,445,697 B1 * | 9/2002 | Fenton ........................ 370/357 |
| 6,515,984 B1 * | 2/2003 | Arimilli et al. ............. 370/352 |
| 6,584,110 B1 * | 6/2003 | Mizuta et al. ............... 370/401 |
| 6,600,738 B1 * | 7/2003 | Alperovich et al. ......... 370/466 |
| 6,603,774 B1 * | 8/2003 | Knappe et al. ............. 370/352 |
| 6,640,239 B1 * | 10/2003 | Gidwani ..................... 370/353 |
| 6,731,734 B1 * | 5/2004 | Shaffer et al. ......... 379/202.01 |

* cited by examiner

*Primary Examiner*—Zarni Maung
*Assistant Examiner*—Van Nguyen
(74) *Attorney, Agent, or Firm*—Leon R. Turkevich; Jeffrey S. Melcher

(57) ABSTRACT

An IP telephony gateway and a media server are configured for changing media streams during an existing call according to the voice over IP (H.323) protocol, where a first H.245 media channel configured for transmitting a first media stream at a corresponding first compression such as G.723 or G.729A is closed and a second H.245 media channel configured for transmitting a second media stream at a corresponding second compression such as G.711 is opened during the same H.225 call.

51 Claims, 3 Drawing Sheets

SCALABLE VOICE OVER IP SYSTEM CONFIGURED FOR DYNAMICALLY SWITCHING CODECS DURING A CALL

BACKGROUND OF THE INVENTION

1. Field of the Invention

The present invention relates to systems configured for providing advanced telephony-type services for subscribers in a voice over Internet Protocol (IP) network according to H.323 protocol.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure. Hence, the reliance on proprietary protocols and closed development environments by telecommunications equipment providers has limited service providers to vendor-specific implementations of voice and telephony services.

Voice over IP technology is under development as part of an alternative open packet telephony communications network, distinct from the public (circuit switched) telephone network, capable of using packet switched networks for integrating voice, data, facsimile, and Internet services, and the like. New packet telephony voice services are being built from open standards such as The International Telecommunications Union (ITU) Recommendation H.323. Recommendation H.323 defines the components, procedures, and protocols necessary to provide audiovisual communications on local area networks. Recommendation H.323 is based on the Real Time Protocol/Control Protocol (RTP/RTCP) of the Internet Engineering Task Force (IETF), and applies to either point-to-point or multipoint sessions, and references many other ITU recommendations, including H.225 and H.245. Recommendation H.225 specifies messages for call control including signaling, registration and admissions, and packetization/synchronization of media streams. Recommendation H.245 specifies messages for opening and closing channels for media streams, and other commands, requests and indications.

However, the existing H.323 standard does not specify features that provide flexibility for deployment of an IP-based system that supports advanced application services such as unified messaging. In particular, unified messaging involves presenting subscribers with messages in a prescribed format, even if the messages are stored in a different, incompatible format. For example, a messaging subscriber accessing a unified messaging system via telephone may rely on a text to speech converter to convert text-based messages such as e-mail messages into speech. Existing text to speech software processes currently have native support only for G.711 codecs: G.711 is an international standard for encoding telephone audio on a 64 kbps channel. However, G.729 (or G.729A) and G.723 are alternative standards for encoding toll quality telephone audio on an 8 kbps channel and 6.4 kbps channel, respectively. Hence, if a service provider wishes to deploy a voice over IP network that takes advantage of compression schemes such as G.729A or G.723 to conserve resources such as disk space for voice messages, the unified messaging system needs to support multiple codecs in a scalable manner.

SUMMARY OF THE INVENTION

There is a need for enhanced IP-based communication services that enable a services subscriber to utilize a user interface application, such as a unified messaging application or a voice activated dialing application, that dynamically switches between codecs in order to support applications configured for operating using the different codecs.

There is also a need for an arrangement that enables an IP telephony gateway to close an existing media stream configured for operating at a first compression rate on an existing connection and open on the existing connection a new media stream operating at a second compression rate.

These and other needs are attained by the present invention, where an IP telephony gateway and a media server are configured for changing media streams during an existing call according to voice over IP (H.323) protocol, where a first media channel configured for transmitting a first media stream at a corresponding first compression is closed and a second media channel configured for transmitting a second media stream at a corresponding second compression is opened during the same call.

One aspect of the present invention provides a method in a media server configured for providing telecommunications user interface services to a subscriber. The method includes establishing a call having a first media channel with an IP telephony gateway, the first media channel configured for transmitting a first media stream according to a corresponding first compression. The method also includes initiating closing of the first media channel based on a request for a resource utilizing a second compression, and starting for the call a second media channel, configured for transmitting a second media stream according to the second compression, upon closing the first media channel. The initiation of closing the first media channel, and starting the second media channel, enables the media server to dynamically switch during a call between codecs having respective compression characteristics. Hence, the media server can provide advanced call services for the subscriber, enabling a subscriber to access during the same call different resources having respective codec configurations, such as a voicemail system utilizing low-bandwidth codecs such as G.729A or G.723 at 8 kbps, followed by access to a text-to-speech resource utilizing a G.711 codec operating at 64 kbps.

Another aspect of the present invention provides a media server comprising a first interface and a second interface. The first interface is configured for establishing with an IP telephony gateway a call having a first media channel configured for transmitting a media stream according to a first compression, the first interface configured for initiating closing of the first media channel and starting for the call a second media channel, configured for transmitting a second media stream according to a second compression, based on a request for a resource utilizing the second compression. The second interface is configured for receiving from the resource a media stream having the second compression. Hence, the media server can supply media streams having different compression formats during the same call by closing one media channel and opening another media channel configured for a different compression.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
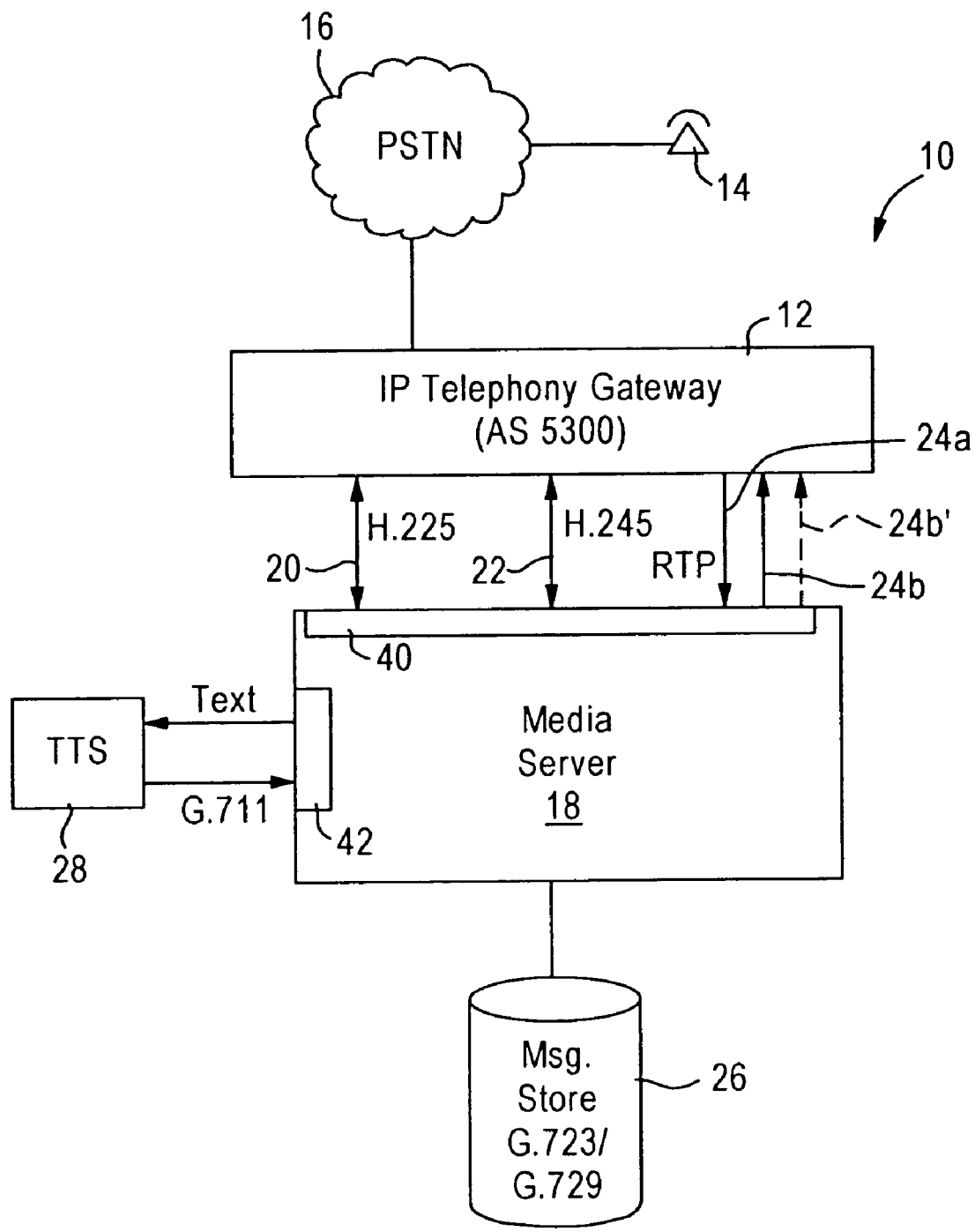
FIG. 1 is a block diagram illustrating a voice over IP system having a voice over IP gateway and a media server configured for dynamically switching codecs during a voice over IP call according to an embodiment of the present invention.

FIG. 1 is a diagram illustrating a voice over IP user interface system configured for dynamically changing codecs during a voice over IP call according to an embodiment of the present invention. The system 10 includes an IP telephony gateway 12, implemented for example using a Cisco AS5300 Universal Access Server, configured for establishing Real Time Protocol (RTP) data stream connections according to H.323 protocol for a calling party 14 dialing into an IP-based resource via the public switched telephone network 16. The system 10 also includes a media server 18, for example an IP-based unified messaging system configured for establishing unified messaging sessions with the calling party 14. An exemplary implementation of the unified messaging system is the commercially available Cisco Unified Open Network Exchange (Cisco uOne) (Products UONE-FOUND 4.1S, and UONE-VOICEMSG4.1S) from Cisco Systems, Inc.

The media server 18 is configured for establishing H.323 calls with the IP telephony gateway 12 on a first interface 40 by exchanging call control and signaling commands across an H.225 call control channel 20. In particular, the media server 18 is implemented as an H.323 compliant software resource configured for executing selected user interface applications, for example a unified messaging system. The media server 18 also is configured for sending and receiving channel control messages on an H.245 media control channel 22 setup and tear down of Real Time Protocol (RTP) media channels 24 configured for transmitting media streams according to a prescribed compression.

Figure 2:
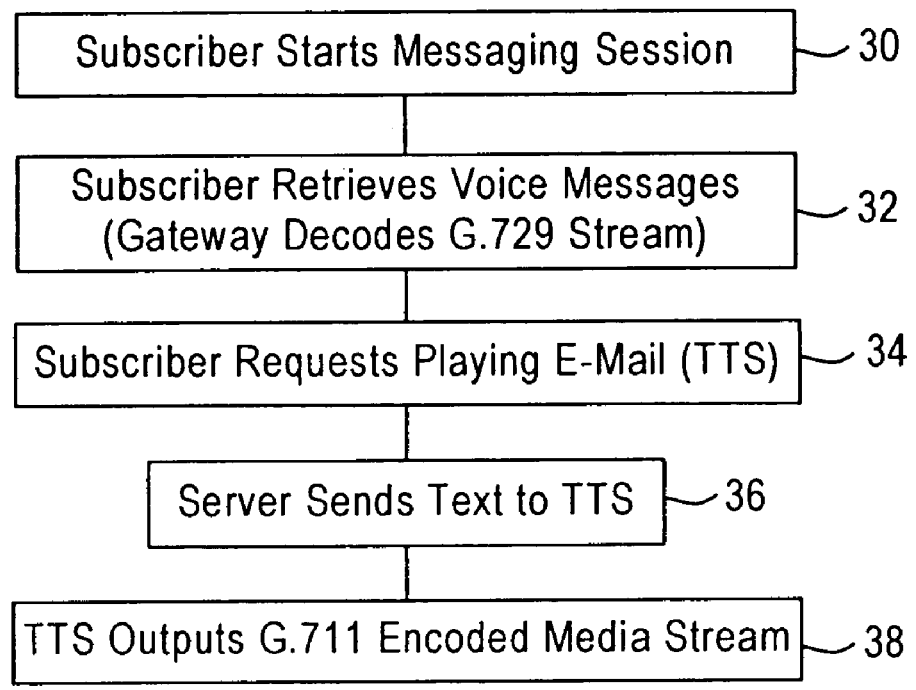
FIG. 2 is a flow diagram illustrating a voice over IP call that necessitates switching codecs during the call.

FIG. 2 illustrates a scenario where the media server 18 may need to dynamically switch codecs during a voice over IP call. Typically the media server 18 is accessed in step 30 for storage and retrieval of voice messages or messaging prompts from a message store 26 in step 32, for example an IMAP type directory that stores voice messages according to G.723 or G.729 compression in order to conserve disk resources. In this case, the media server 18, having established an RTP media channel 24b for transmitting a media stream according to G.729 compression, transfers the media stream via the media channel 24b to the IP telephony gateway 12; the IP telephony gateway, having activated its internal G.729 codec during the initial establishment of the RTP media channel 24b, generates analog speech signals using its internal G.729 codec based on the G.729 speech samples transferred in the media stream via the media channel 24b.

In some cases, however, the media server 18 may need to transfer media data received on a second interface 42 from a text to speech resource 28 that generates speech according to a different compression, such as G.711. For example, the subscriber may request in step 34 that the media server 18 plays a stored e-mail message; in such a case, the media server 18 sends the text to a text to speech converter 28, configured for generating audio data using a higher data rate codec, for example a G.711 codec configured for generating audio samples at 64 kbps. Hence, the text to speech converter 28 outputs in step 38 G.711-encoded media data to the media server 18, which is incompatible with the internal G.729 codec activated by the IP telephony gateway 12 for the media channel 24b. One alternative would be that the media server 18 transcodes the media stream from G.711 compression to G.729 compression; however, such an approach requires substantial processor resources within the media server 18 and hence does not scale well for large scale deployment.

According to the disclosed embodiment, the media server is configured for dynamically switching codecs during the voice over IP call established by the H.225 call control channel 20 by closing the media channel 24b configured for transmitting G.729 media streams, and starting for the call a second media channel 24b' configured for transmitting a media stream according to the G.711 compression utilized by the text to speech converter 28. In particular, the media server 18 sends a close logical channel message for its outbound RTP channel 24b via the H.245 media control channel 28. After the IP telephony gateway 12 acknowledges the close logical channel message, the media server 18 sends an open logical channel message on the H.245 media control channel 28, specifying that a G.711 codec be enabled by the IP telephony gateway 12. Once the IP telephony gateway 12 acknowledges the open logical channel message, the media server 18 is ready to play the output from the text to speech server 28 according to the G.711 compression. Note that the inbound media channel 24a (i.e., from the IP telephony gateway 12 to the media server 18) may continue to use G.729A compression if the IP telephony gateway 12 supports asymmetric codecs. Once the text to speech play is completed, or if the text to speech play is interrupted by the subscriber, the media server 18 can reverse the process and switch back to the G.729A compression prior to playing prompts.

Figure 3:
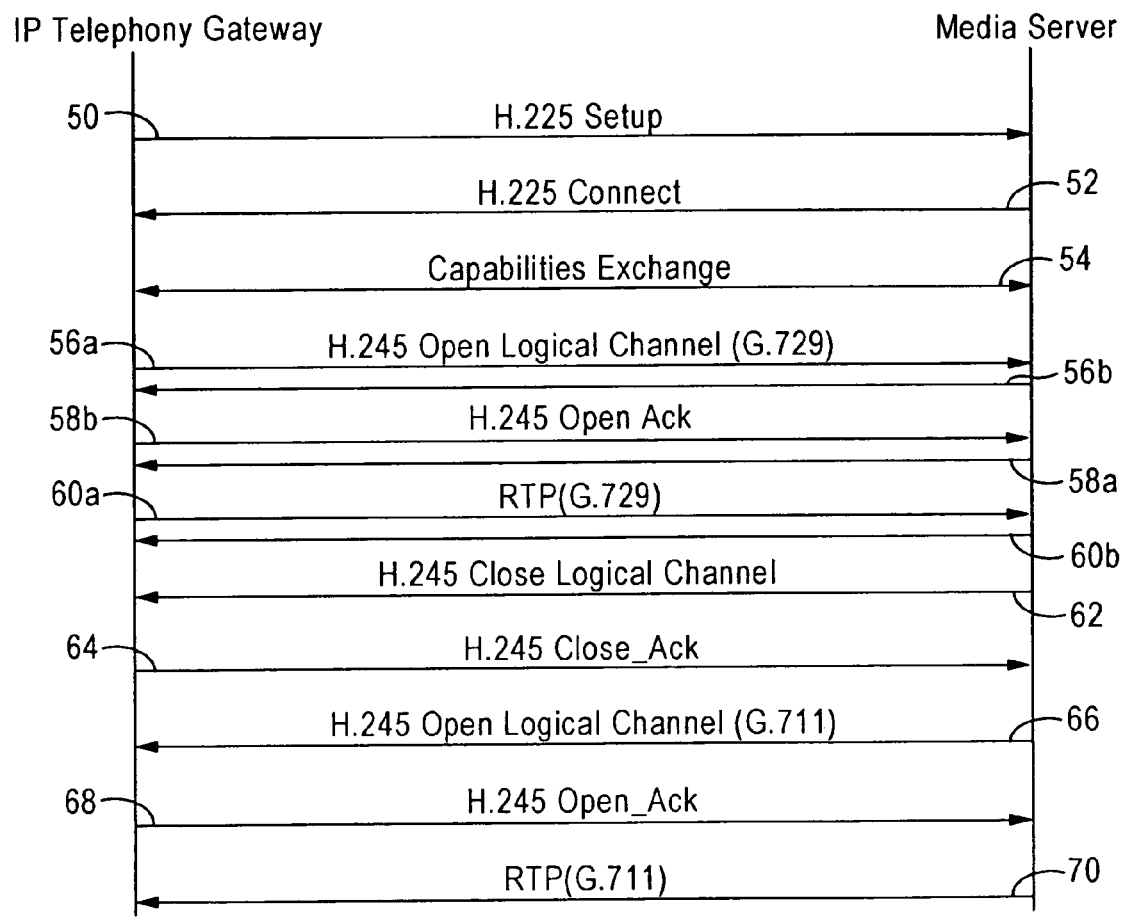
FIG. 3 is a diagram illustrating the method between the voice over IP gateway and the media server for dynamically switching codecs by closing and reopening media streams during a call according to an embodiment of the present invention.

FIG. 3 is a diagram illustrating the method of dynamically switching codecs by the media server 18 according to an embodiment of the present invention. The steps may be implemented as executable code stored on a tangible medium, for example a disk drive, a compact disc, or a transmission line medium. The method begins by the IP telephony gateway 12 sending a setup message in step 50 to the media server 18 on the H.225 call control channel 20 in response to an incoming call from the subscriber 14. The media server 18 in response sends on the H.225 call control channel 20 a connect message back to the IP telephony gateway 12 in step 52. The IP telephony gateway 12 and the media server 18 then exchange capabilities information in step 54 to determine which codecs are available for use.

The IP telephony gateway 12 and the media server 18 each then send an open logical channel message to establish a corresponding RTP media channel 24 for full duplex communications. In particular, the IP telephony gateway 12 sends a logical channel open message in step 56a on the H.245 media control channel 22, and the media server 18 responds by sending an acknowledgment in step 58a, causing the IP telephony gateway 12 to open the media channel 24a in step 60a using for example the G.729 compression. The media server 18 also sends a logical channel open message in step 56b on the H.245 media control channel 22, and the IP telephony gateway 12 responds by sending an acknowledgment in step 58b, causing the media server 18 to open the media channel 24b in step 60b using the G.729 compression. At this point, the IP telephony gateway 12 and the media server 18 have established a full duplex, two-way RTP channel (24a and 24b) using preferred voice mail compression, such as G.729.

Assume now that the messaging subscriber 14 requests use of the text to speech resource 28, configured for utilizing a second compression such as G.711. The media server 18 determines that a codec switch is necessary, and initiates the text to speech conversion process by sending the text to the text to speech resource. The media server 18 also sends via the H.245 media control channel 22 in step 62 a close logical channel message for the outbound RTP channel 24b. The IP telephony gateway 12 acknowledges the close logical channel message in step 64, causing the media server 18 to send another H.245 open logical channel message in step 66 that specifies that a G.711 codec be enabled in the IP telephony gateway 12. The IP telephony gateway 12 enables its internal G.711 codec, and acknowledges the open logical channel message via the H.245 media control channel 22 in step 68. Once the media server 18 receives the acknowledgment, the media server 18 starts in step 70 the new RTP media channel 24b' configured for transmitting the G.711 media stream from the text to speech resource 28 to the IP telephony gateway 12.

According to the disclosed embodiment, a voice over IP system is configured for supporting multiple codecs and switching between codecs during a call. Hence, a media server can utilize different third party resources that have native support only for certain codecs such as G.711, increasing the flexibility of IP based unified messaging systems that need to support applications that require different compression formats. Moreover, the ability to switch between codecs during a call eliminates the necessity for transcoding from G.711 to G.729 in real-time; hence, processor resources are conserved, increasing the scalability of the messaging system. Moreover, the switching between codecs during a call has a lower latency than transcoding, providing a better user experience while the user is listening to text-based messages such as e-mails.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a media server, the method comprising:
   establishing a call having a first media channel with an IP telephony gateway, the first media channel configured for transmitting a first media stream according to a corresponding first compression;
   initiating closing of the first media channel based on a request for a resource utilizing a second compression; and
   starting for the call a second media channel, configured for transmitting a second media stream according to the second compression, upon closing the first media channel,
   wherein the establishing step includes:
   receiving a setup message from the IP telephony gateway on a call control channel;
   exchanging compression capabilities information with the IP telephony gateway;
   sending to the IP telephony gateway, on a media control channel, an open channel message requesting establishment of the first media channel according to the first compression based on the compression capabilities information; and
   initiating transmission of the first media stream on the first media channel in response to an acknowledgment to the open channel message.

2. The method of claim 1, wherein:
   the receiving step includes receiving the setup message according to H.225 protocol;
   the sending step includes sending the open channel message according to H.245 protocol; and
   the initiating transmission step includes sending the first media stream according to Real Time Protocol (RTP).

3. The method of claim 1, wherein the initiating closing step includes outputting a close channel message on the media control channel according to H.245 protocol.

4. The method of claim 1, further comprising transferring media data from a text to speech resource to the second media channel as the second media stream.

5. The method of claim 2, wherein the sending step includes specifying in the open message the first compression as up to 8 kbps.

6. The method of claim 3, wherein the starting step includes sending on the media control channel a second open channel message requesting establishment of the second media channel according to the second compression, based on the compression capabilities information and reception of an acknowledgment to the close channel message.

7. The method of claim 5, wherein specifying step includes specifying one of G.729 and G.723 encoding as the first compression.

8. The method of claim 6, wherein the starting step further includes initiating transmission of the second media stream on the second media channel in response to an acknowledgment to the second open channel message.

9. The method of claim 7, wherein the initiating closing step includes outputting a close channel message on the media control channel according to H.245 protocol.

10. The method of claim 8, wherein:
    the step of sending the open channel message includes specifying one of G.729 and G.723 encoding as the first compression;
    the step of sending the second open channel message includes specifying G.711 as the second compression.

11. The method of claim 9, wherein the starting step includes sending on the media control channel a second open channel message requesting establishment of the second media channel according to the second compression, based on the compression capabilities information and reception of an acknowledgment to the close channel message.

12. The method of claim 11, wherein the starting step further includes initiating transmission of the second media stream on the second media channel in response to an acknowledgment to the second open channel message.

13. The method of claim 12, wherein the step of sending the second open channel message includes specifying in the second open message the second compression as greater than 8 kbps.

14. The method of claim 13, wherein the step of specifying the second compression includes specifying G.711 encoding as the second compression.

15. A system configured for providing media services to a subscriber over an Internet protocol (IP) telephony link, the system comprising:
an IP telephony gateway configured for establishing IP-based calls having media stream connections according to specified compression formats; and
a media server configured for establishing a call having a first media channel with the IP telephony gateway for transfer of a first media stream according to a corresponding first compression based on determined capabilities between the media server and the IP telephony gateway, the media server configured for closing the first media channel and starting for the call a second media channel, configured for transmitting a second media stream according to a second compression, based on a request for a resource utilizing the second compression:
wherein the media server comprises:
(1) a first interface configured for establishing the call and transferring at least one of the first and second media streams on the first media channel and the second media channel, respectively, the first interface configured for establishing the call by sending, on a call control channel, a connect message in response to receiving from the IP telephony gateway a setup message on the call control channel; and
(2) a second interface configured for receiving from the resource a media stream having the second compression.

16. The system of claim 15, wherein the first interface is configured for closing the first media channel by sending, on a media control channel, a close channel message for the first media channel to the IP telephony gateway and based on an acknowledgment to the close channel message.

17. The system of claim 16, wherein the first compression is at least one of G.729 encoding and G.723 encoding.

18. The system of claim 16, wherein the first interface is configured for starting the second media channel by sending, on the media control channel, an open channel message for the second media channel that specifies the second compression and based on closing of the first media channel.

19. The system of claim 18, wherein the first interface specifies within the open channel message G.711 as the second compression.

20. A media server comprising:
a first interface configured for establishing with an IP telephony gateway a call having a first media channel configured for transmitting a media stream according to a first compression, the first interface configured for initiating closing of the first media channel and starting for the call a second media channel, configured for transmitting a second media stream according to a second compression, based on a request for a resource utilizing the second compression; and
a second interface configured for receiving from the resource a media stream having the second compression,
wherein the first interface is configured for establishing the call by sending, on a call control channel, a connect message in response to receiving from the IP telephony gateway a setup message on the call control channel.

21. The server of claim 20, wherein the first interface is configured for closing the first media channel by sending, on a media control channel, a close channel message for the first media channel to the IP telephony gateway and based on an acknowledgment to the close channel message.

22. The server of claim 21, wherein the first compression is at least one of G.729 encoding and G.723 encoding.

23. The server of claim 21, wherein the first interface is configured for starting the second media channel by sending, on the media control channel, an open channel message for the second media channel that specifies the second compression and based on closing of the first media channel.

24. A computer readable medium having stored thereon sequences of instructions for establishing an IP-based call for providing calling services to a subscriber, the sequences of instructions including instructions for performing the steps of:
establishing a call having a first media channel with an IP telephony gateway, the first media channel configured for transmitting a first media stream according to a corresponding first compression;
initiating closing of the first media channel based on a request for a resource utilizing a second compression; and
starting for the call a second media channel, configured for transmitting a second media stream according to the second compression, upon closing the first media channel,
wherein the establishing step includes:
receiving a setup message from the IP telephony gateway on a call control channel;
exchanging compression capabilities information with the IP telephony gateway;
sending to the IP telephony gateway, on a media control channel, an open channel message requesting establishment of the first media channel according to the first compression based on the compression capabilities information; and
initiating transmission of the first media stream on the first media channel in response to an acknowledgment to the open channel message.

25. The medium of claim 24, wherein:
the receiving step includes receiving the setup message according to H.225 protocol;
the sending step includes sending the open channel message according to H.245 protocol; and
the initiating transmission step includes sending the first media stream according to Real Time Protocol (RTP).

26. The medium of claim 24, wherein the initiating closing step includes outputting a close channel message on the media control channel according to H.245 protocol.

27. The medium of claim 24, further comprising instructions for performing the step of transferring media data from a text to speech resource to the second media channel as the second media stream.

28. The medium of claim 25, wherein the sending step includes specifying in the open message the first compression as up to 8 kbps.

29. The medium of claim 26, wherein the starting step includes sending on the media control channel a second open channel message requesting establishment of the second media channel according to the second compression, based on the compression capabilities information and reception of an acknowledgment to the close channel message.

30. The medium of claim 28, wherein specifying step includes specifying one of G.729 and G.723 encoding as the first compression.

31. The medium of claim 29, wherein the starting step further includes initiating transmission of the second media stream on the second media channel in response to an acknowledgment to the second open channel message.

32. The medium of claim 30, wherein the initiating closing step includes outputting a close channel message on the media control channel according to H.245 protocol.

33. The medium of claim 31, wherein:
the step of sending the open channel message includes specifying one of G.729 and G.723 encoding as the first compression;
the step of sending the second open channel message includes specifying G.711 as the second compression.

34. The medium of claim 32, wherein the starting step includes sending on the media control channel a second open channel message requesting establishment of the second media channel according to the second compression, based on the compression capabilities information and reception of an acknowledgment to the close channel message.

35. The medium of claim 34, wherein the starting step further includes initiating transmission of the second media stream on the second media channel in response to an acknowledgment to the second open channel message.

36. The medium of claim 35, wherein the step of sending the second open channel message includes specifying in the second open message the second compression as greater than 8 kbps.

37. The medium of claim 36, wherein the step of specifying the second compression includes specifying G.711 encoding as the second compression.

38. A media server comprising:
means for establishing a call having a first media channel with an IP telephony gateway the first media channel configured for transmitting a first media stream according to a corresponding first compression;
means for initiating closing of the first media channel based on a request for a resource utilizing a second compression; and
means for starting for the call a second media channel, configured for transmitting a second media stream according to the second compression, upon closing the first media channel,
wherein the establishing means includes:
means for receiving a setup message from the IP telephony gateway on a call control channel;
means for exchanging compression capabilities information with the IP telephony gateway;
means for sending to the IP telephony gateway, on a media control channel, an open channel message requesting establishment of the first media channel according to the first compression based on the compression capabilities information; and
means for initiating transmission of the first media stream on the first media channel in response to an acknowledgment to the open channel message.

39. The server of claim 38, wherein:
the receiving means is configured for receiving the setup message according to H.225 protocol;
the sending means is configured for sending the open channel message according to H.245 protocol; and
the initiating transmission means is configured for sending the first media stream according to Real Time Protocol (RTP).

40. The server of claim 38, wherein the initiating closing means is configured for outputting a close channel message on the media control channel according to H.245 protocol.

41. The server of claim 38, further comprising means for transferring media data from a text to speech resource to the second media channel as the second media stream.

42. The server of claim 39, wherein the sending means is configured for specifying in the open message the first compression as up to 8 kbps.

43. The server of claim 40, wherein the starting means is configured for sending on the media control channel a second open channel message requesting establishment of the second media channel according to the second compression, based on the compression capabilities information and reception of an acknowledgment to the close channel message.

44. The server of claim 42, wherein specifying means is configured for specifying one of G.729 and G.723 encoding as the first compression.

45. The server of claim 43, wherein the starting means is configured for initiating transmission of the second media stream on the second media channel in response to an acknowledgment to the second open channel message.

46. The server of claim 43, wherein the sending means is configured for specifying one of G.729 and G.723 encoding as the first compression, and G.711 as the second compression.

47. The server of claim 44, wherein the initiating closing means is configured for outputting a close channel message on the media control channel according to H.245 protocol.

48. The server of claim 47, wherein the starting means is configured for sending on the media control channel a second open channel message requesting establishment of the second media channel according to the second compression, based on the compression capabilities information and reception of an acknowledgment to the close channel message.

49. The server of claim 48, wherein the starting means is configured for initiating transmission of the second media stream on the second media channel in response to an acknowledgment to the second open channel message.

50. The server of claim 49, wherein the sending means is configured for specifying in the second open message the second compression as greater than 8 kbps.

51. The server of claim 50, wherein the sending means is configured for specifying G.711 encoding as the second compression.

* * * * *

UNITED STATES PATENT AND TRADEMARK OFFICE
CERTIFICATE OF CORRECTION

| | | |
|---|---|---|
| PATENT NO. | : 6,977,911 B1 | Page 1 of 1 |
| APPLICATION NO. | : 09/629057 | |
| DATED | : December 20, 2005 | |
| INVENTOR(S) | : David William Geen, Narasimha K. Nayak and Tribhuvan Kambham | |

It is certified that error appears in the above-identified patent and that said Letters Patent is hereby corrected as shown below:

Col. 10, Please insert the following: --Claim 52. The system of claim 23, wherein the first interface specifies within the open channel message G.711 as the second compression.--

Signed and Sealed this

Twenty-fifth Day of December, 2007

JON W. DUDAS
*Director of the United States Patent and Trademark Office*